US00RE44545E

(19) United States
(12) Reissued Patent
Schegerin

(10) Patent Number: US RE44,545 E
(45) Date of Reissued Patent: Oct. 22, 2013

(54) RESPIRATOR MASK WITH HYGIENIC PROTECTION

(75) Inventor: Robert Schegerin, Chevilly-Larue (FR)

(73) Assignee: Intertechnique (FR)

(21) Appl. No.: 13/211,604

(22) Filed: Aug. 17, 2011

Related U.S. Patent Documents

Reissue of:
(64) Patent No.: 7,575,006
Issued: Aug. 18, 2009
Appl. No.: 10/555,816
PCT Filed: May 14, 2004
PCT No.: PCT/FR2004/001195
§ 371 (c)(1),
(2), (4) Date: Nov. 7, 2005
PCT Pub. No.: WO2004/103476
PCT Pub. Date: Dec. 2, 2004

(30) Foreign Application Priority Data

May 16, 2003 (FR) ..... 03 05993

(51) Int. Cl.
*A62B 18/02* (2006.01)

(52) U.S. Cl.
CPC ..... *A62B 18/02* (2013.01)
USPC ..... 128/206.28; 128/206.21; 128/205.25; 128/200.24

(58) Field of Classification Search
USPC ..... 128/857, 863, 200.24, 200.27, 200.28, 128/201.22, 201.23, 201.24, 201.25, 128/202.27, 203.29, 205.25, 206.12, 128/206.21, 206.27, 206.28
See application file for complete search history.

(56) References Cited

U.S. PATENT DOCUMENTS 762,039 A 6/1904 Freel
2,067,026 A * 1/1937 Schwartz ..... 128/206.12
2,939,458 A * 6/1960 Lundquist ..... 128/206.25
3,315,674 A 4/1967 Bloom et al.
3,330,273 A * 7/1967 Bennett ..... 128/206.26
3,757,777 A 9/1973 Kaufman
4,063,559 A * 12/1977 Tritsch ..... 604/390
4,361,146 A * 11/1982 Woicke ..... 128/206.12
4,458,679 A 7/1984 Ward
4,579,113 A * 4/1986 McCreadie et al. ..... 128/202.13
4,589,410 A * 5/1986 Miller ..... 128/207.15
4,597,781 A 7/1986 Spector
4,641,379 A 2/1987 Martin
4,739,755 A 4/1988 White et al.
4,846,170 A * 7/1989 McAnalley et al. ..... 128/207.13
4,873,972 A 10/1989 Magidson
4,971,051 A 11/1990 Toffolon
5,003,633 A 4/1991 Itoh
5,080,094 A 1/1992 Tayebi (Continued)

FOREIGN PATENT DOCUMENTS

CN 1095631 11/1994
DE 390903 C 6/1924

(Continued)

*Primary Examiner* — Annette Dixon
(74) *Attorney, Agent, or Firm* — Dean W. Russell; Kristin M. Crall; Kilpatrick Townsend & Stockton LLP

(57) ABSTRACT

The invention relates to a respirator mask with hygienic protection. More specifically, the invention relates to a respirator face mask (2) which provides physiological protection, comprising: an oronasal face piece (10), a semi-flexible lip element (6) which is used to position the oronasal face piece (10) on the user's face (1), and hygienic protection means (4) which are removably-positioned at least partially inside the mask (2). The aforementioned removable protection means (4) comprise (i) a first part (4a) which provides hygienic protection and (ii) a second part (4b) which maintains the hygienic protection means (4) inside the mask (2), said second part (4b) co-operating elastically with the above-mentioned semi-flexible lip element (6) or the face piece (10).

30 Claims, 3 Drawing Sheets

(56) References Cited

U.S. PATENT DOCUMENTS

| | | | | |
|---|---|---|---|---|
| 5,094,236 | A | 3/1992 | Tayebi | |
| 5,155,863 | A | 10/1992 | Roberts | |
| 5,196,244 | A * | 3/1993 | Beck | 428/35.2 |
| 5,267,557 | A * | 12/1993 | Her-Mou | 128/206.21 |
| 5,349,949 | A | 9/1994 | Schegerin | |
| 5,372,130 | A * | 12/1994 | Stern et al. | 128/205.25 |
| 5,676,133 | A | 10/1997 | DeVilliers et al. | |
| 6,112,746 | A | 9/2000 | Kwok et al. | |
| 6,596,016 | B1 * | 7/2003 | Vreman et al. | 607/88 |
| 6,860,268 | B2 | 3/2005 | Bohn et al. | |
| 7,575,006 | B2 * | 8/2009 | Schegerin | 128/206.28 |
| 2002/0134388 | A1 | 9/2002 | Chang | |

FOREIGN PATENT DOCUMENTS

| | | | |
|---|---|---|---|
| DE | 3032437 | A | 3/1982 |
| DE | 20001040 | U1 | 11/2000 |
| EP | 0258508 | A1 | 9/1986 |
| EP | 0686408 | A | 12/1995 |
| FR | 2657264 | | 1/1990 |
| FR | 2682043 | | 4/1993 |
| FR | 2735030 | A1 | 6/1995 |
| FR | 2812819 | A | 2/2002 |
| FR | 0104670 | | 10/2002 |
| FR | 03 00419 | | 7/2004 |
| FR | 03 01024 | | 7/2004 |
| FR | 0300419 | | 7/2004 |
| FR | 0301024 | | 7/2004 |
| GB | 848215 | | 2/1958 |
| GB | 2074457 | | 11/1981 |
| GB | 2 176 404 | A | 12/1986 |
| GB | 2176404 | | 12/1986 |
| WO | 9804310 | | 2/1998 |
| WO | 0241717 | | 5/2002 |
| WO | WO/02/41717 | A2 | 5/2002 |

* cited by examiner

RESPIRATOR MASK WITH HYGIENIC PROTECTION

Matter enclosed in heavy brackets [ ] appears in the original patent but forms no part of this reissue specification; matter printed in italics indicates the additions made by reissue.

CROSS REFERENCE TO RELATED APPLICATIONS

This application is the U.S. national phase of International Application No. PCT/FR2004/001195 filed on May 14, 2004, which application claims priority to French Patent Application No. 03/05,993 filed on May 16, 2003, the contents of which are incorporated by reference herein.

The present invention relates to respirator masks with hygienic protection.

More specifically, the present invention relates to respirator face masks providing physiological protection, particularly for aircraft flight crew.

BACKGROUND OF THE INVENTION

The invention relates, for example, to the respiratory protection masks used by civil airplane pilots to combat hypoxia in particular. The protection masks for civil airplane pilots are part of the airplane and are used by several pilots in turn, particularly for tests or preventive uses of the masks. It will be understood that this causes a degree of physiological discomfort for the pilots and that it is not without risk concerning certain infections.

One object of the invention is to overcome at least some of the abovementioned drawbacks.

BRIEF SUMMARY OF THE INVENTION

To this end, there is proposed, according to the invention, a respirator face mask providing physiological protection, particularly for aircraft flight crew, comprising:

- an oronasal face piece designed to be connected to a respiratory gas source,
- a semi-flexible lip element with an edge designed to position the oronasal face piece on the face of a user, and
- hygienic protection means which are removably positioned at least partially inside the mask and including a first part which provides hygienic protection and a second part which maintains the hygienic protection means inside the mask, this second part co-operating elastically with the semi-flexible lip element or the face piece.

The hygienic protection means are removable and can therefore be easily replaced between consecutive uses. This is made particularly possible by the second part which cooperates elastically with the semi-flexible lip element or the face piece. Besides the fact that this elastic cooperation facilitates the fitting of the hygienic protection means on the mask and their removal from the mask, it can, if necessary, be used to provide a degree of seal-tightness between the hygienic protection means and the semi-flexible lip element or the face piece.

According to certain embodiments of the invention, for which separate patented protections may, if necessary, be sought individually at a later date, one and/or other of the following provisions may, if necessary, be applied:

- the first and second parts of the hygienic protection means include different materials;

- the second part is in contact with at least an internal part of the semi-flexible lip element;
- a thin lip element prolongs, at least in certain areas, the second part, so as to extend a few millimeters beyond the free edge of the semi-flexible lip element;
- the thin lip element is prolonged over at least an external part of the semi-flexible lip element;
- the first part of the hygienic protection means includes a filter allowing the respiratory gases to pass through;
- the first part at least partly filters any infection from the user;
- the first part has a corrugated shape, in order to reduce the pressure drop of the hygienic protection means;
- the corrugated shape corresponds to waves substantially centered about a central area of the hygienic protection means, to facilitate extraction of the hygienic protection means from the mask;
- the mask includes a cord, attached to the hygienic protection means, facilitating the extraction of the hygienic protection means from the mask;
- the second part is made of silicone;
- the first part of the hygienic protection means covers an area of the semi-flexible lip element which, in the absence of hygienic protection means, would have been in contact with the face once the mask was in place on the latter;
- the second part includes an elastic thread gripping the semi-flexible lip element;
- a flexible structure is placed between the hygienic protection means and an internal part of the semi-flexible lip element and extending beyond the latter;
- a flexible structure is placed outside the hygienic protection means, inside the semi-flexible lip element and extending beyond the latter;
- the mask includes:
  - a part located outside the semi-flexible lip element and including a structural part providing the seal between the semi-flexible lip element and the hygienic protection means,
  - another part located over the entire external part of the semi-flexible lip element which, in the absence of hygienic protection means, would have been in contact with the face once the mask was in place on the latter, and
- a third part which is designed to be pressed onto the face, by the effect of the pressure of the respiratory gas inside the mask, when the mask is worn, to provide a seal between the protection means and the face;
- the structural part exerts a mechanical pressure on the semi-flexible lip element, the value of which is greater than the maximum value of the maximum pressure of the respiratory gas, which can prevail inside the mask;
- the first, second and third areas are formed by a single elastic film; and
- the structural part includes an elastic thread.

Other aspects, objects and advantages of the invention will become apparent from reading the description of a number of these embodiments.

BRIEF DESCRIPTION OF THE DRAWINGS

The invention will be better understood with the help of the drawings in which.

DETAILED DESCRIPTION OF THE DRAWINGS

In the various figures, like references denote identical or similar elements.

Figure 1:
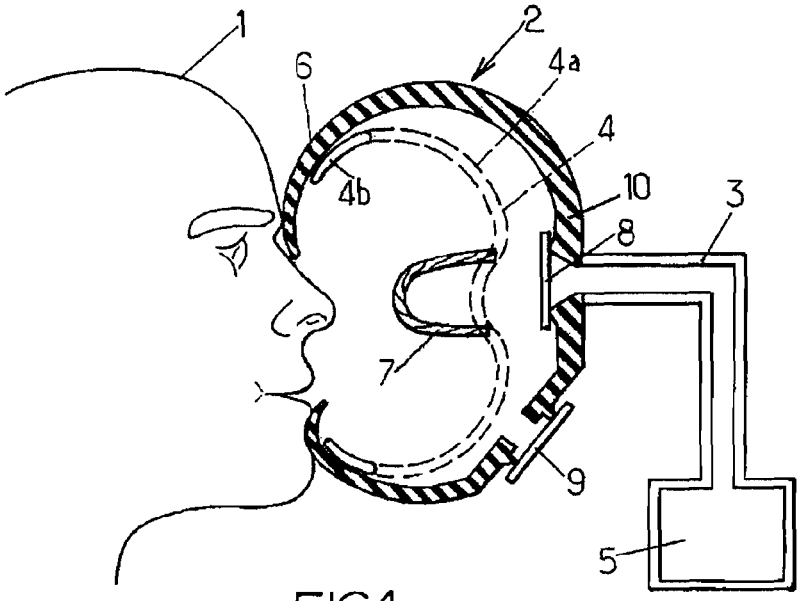
FIG. 1 diagrammatically represents a vertical cross-section of a respiratory device comprising an example of a first embodiment of a mask according to the invention, worn by a user.

A first exemplary embodiment of the mask according to the invention is shown in FIG. 1.

In FIG. 1, a user 1, in this case a civil airplane pilot, is wearing a respiratory protection mask 2, in this case a quick-fitting mask. This mask 2 includes an oronasal face piece 10 and a semi-flexible lip 6. A pipe 3 conveying a respiratory gas supplies the mask 2 with respiratory gas from a respiratory source 5. This pipe 3 is connected in a fluid manner to the oronasal face piece 10. Removable hygienic protection system 4 (which may also be referred to as a "hygienic protection means" at some parts throughout this application), in this case a filter, is placed by the pilot inside the mask 2, for example when he takes his seat in the airplane. This hygienic protection system is made up of at least two main parts 4a and 4b. The first part 4a filters the air breathed out and prevents any infection from penetrating inside the mask, and in particular in a microphone or inspiratory 8 and/or expiratory 9 valves. The first part 4a for example if made of a paper impregnated with an antibiotic, bactericidal or other substance. First part 4a may also be referred to as a filter part 4a. The second part 4b is made of a flexible and airtight material, such as silicone or latex, for example, and is used to secure the hygienic protection system 4 inside the mask 2, and maintain the seal of the hygienic protection system 4 within the mask 2 by contact between this second part 4b and the inside of the semi-flexible lip 6. Second part 4b may also be referred to as lip securing part 4b. If necessary, a cord 7 is fixed to the hygienic protection system 4 to facilitate its extraction from the mask 2.

Figure 2:
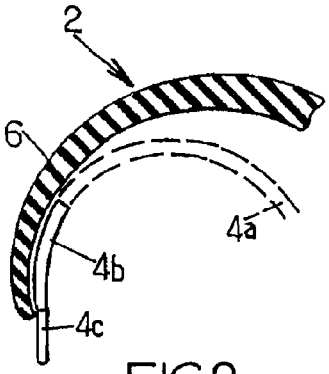
FIG. 2 diagrammatically represents, through a cross-section similar to that of FIG. 1, a detail of a variant of the embodiment of FIG. 1.

According to a variant, illustrated by FIG. 2, a third part 4c, forming a thin lip element, prolongs the part 4b and extends beyond the semi-flexible lip element 6 by a few millimeters to make the mask 2 more comfortable to wear and to improve the seal between the hygienic protection system 4 and face of the user 1. Third part 4c may also be referred to as lip insulation part 4c. This part 4c is, for example, also made of silicone or latex, but is thinner than the part 4b.

Figure 3:
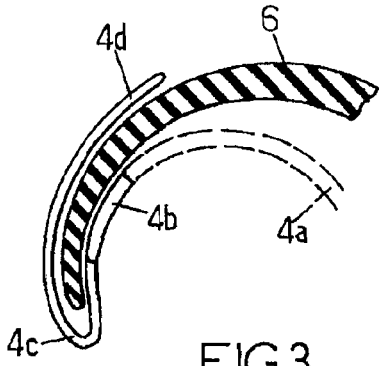
FIG. 3 diagrammatically represents, through a cross-section similar to those of FIGS. 1 and 2, a detail of another variant of the embodiment of FIG. 1.

According to another variant, illustrated by FIG. 3, a fourth part 4d, also forming a thin lip element, prolongs the third part 4c so as to at least partly cover the outer surface of the semi-flexible lip 6. This part 4d also provides a hygienic protection function. It can also be made of silicone or latex like the part 4c. Fourth part 4d may also be referred to as lip extension part 4d.

Figure 4:
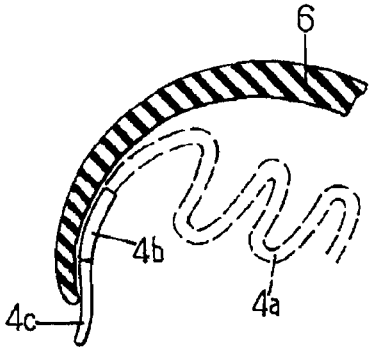
FIG. 4 diagrammatically represents, through a cross-section similar to those of FIGS. 1, 2 and 3, a detail of yet another variant of the embodiment of FIG. 1.

According to yet another variant, illustrated by FIG. 4, the part 4a has a corrugated shape, with corrugations substantially centered inside the mask 2 and/or the inspiratory valve 8, in order to reduce the pressure drop and/or facilitate the handling and/or extraction and replacement of the hygienic protection means 4.

Figure 5:
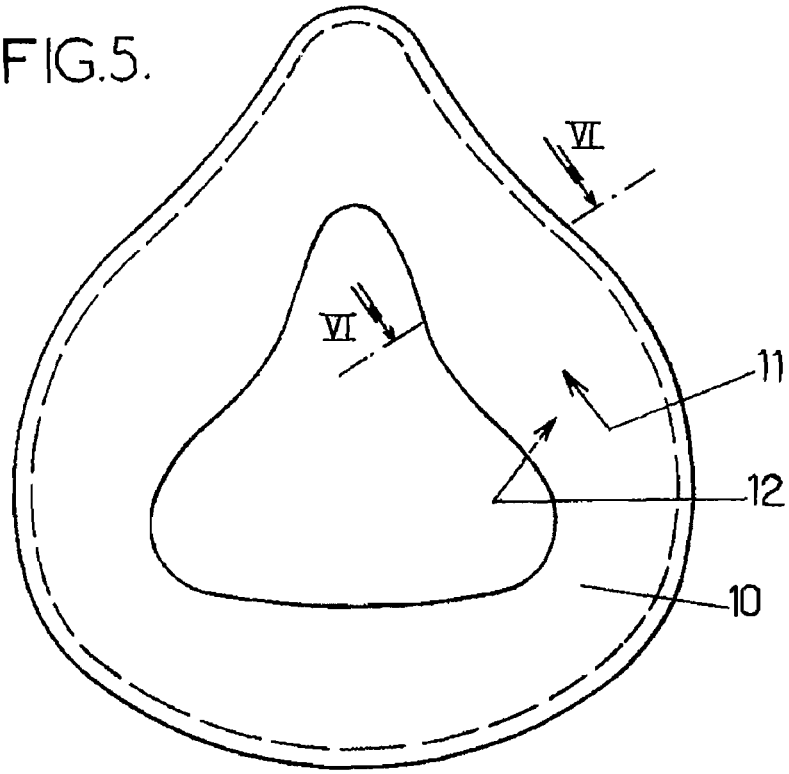
FIG. 5 diagrammatically represents, in elevation, an example of a second embodiment of a mask according to the invention.
Figure 6:
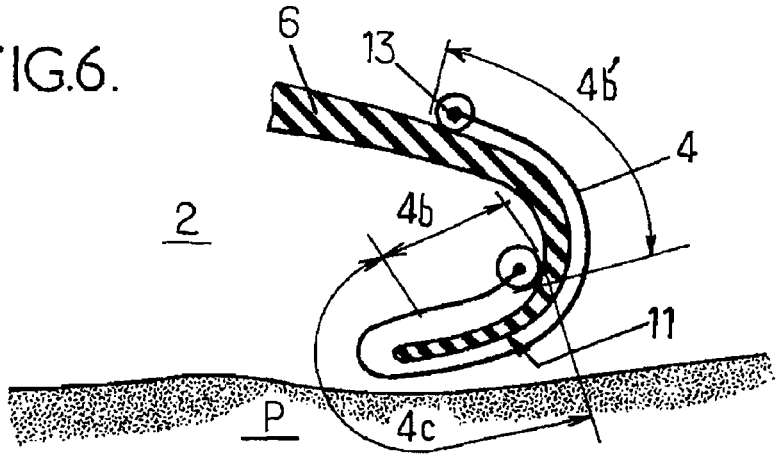
FIG. 6 diagrammatically represents, through a cross-section in the plane VI-VI of FIG. 5, a detail of the embodiment of FIG. 5.

A second exemplary embodiment of the mask according to the invention is shown in FIGS. 5 and 6.

According to this second embodiment, the mask 2 according to the invention includes an oronasal face piece, a semi-flexible lip element and fluid connection means similar to those of the embodiment described above. FIG. 5 more particularly represents the semi-flexible lip element 6, the edge 11 of which, intended to be in contact with the face of a user, is covered by hygienic protection means 4. This edge returns toward the center and the interior of the mask 2, forming an internal groove 12.

FIG. 6 mainly represents this edge 11 of the semi-flexible lip element 6. The hygienic protection means 4, in this case a thin film, includes:

- a part 4c which insulates the semi-flexible lip element 6 from the skin P of the user 1,
- another, so-called structural, part 4b, which rests in the hollow of the semi-flexible lip element 6, preventing the hygienic protection means 4 from coming away from the mask 2, and
- yet another part 4b', placed outside the mask 2, preventing the hygienic protection means 4 from entering into the mask 2 when it is used and if possibly including an elastic thread 13 gripping the semi-flexible lip element 6.

The part 4c which insulates the semi-flexible lip element 6 from the skin P of the user 1 is placed all around this semi-flexible lip element 6. It is placed on the external part of the semi-flexible lip element 6, but, possibly, also over a large portion of its internal part. This part 4c is made of silicone, latex or a fibrous or woven material, for example.

The so-called structural part 4b is more rigid than the part 4c. It is, for example, made of silicone or latex. It has a shape designed to fit inside the internal groove 12 of the semi-flexible lip element 6. It provides for stable positioning of the hygienic protection means 4, preventing them from coming away from the mask 2 while the latter is being used.

The last part 4b', the one possibly including an elastic thread 13, is fixed all around the outer perimeter of the hygienic protection system 4 in order to keep it stably positioned by preventing it from re-entering into the mask 2 while it is being used. This part 4b' can be made of silicone or latex, for example. Part 4b' may also be referred to as lip securing part 4b'.

This architecture takes into account the possible elastic distortions of the mask 2, of the structural part 4b and of the possible thread 13, so that the assembly comprising the hygienic protection means 4, the structural part 4b and the possible elastic thread 13, can easily be replaced after each use.

According to a variant, a flexible structure is placed between the hygienic protection means 4 and an internal part of the semi-flexible lip element 6. This flexible structure, such as a thin film of silicone or latex, for example, extends beyond the semi-flexible lip element 6. In place of or in addition to this flexible structure, another flexible structure, such as a thin film, can be placed outside the hygienic protection means 4, inside the semi-flexible lip element 6 and extending beyond the latter.

Figure 7:
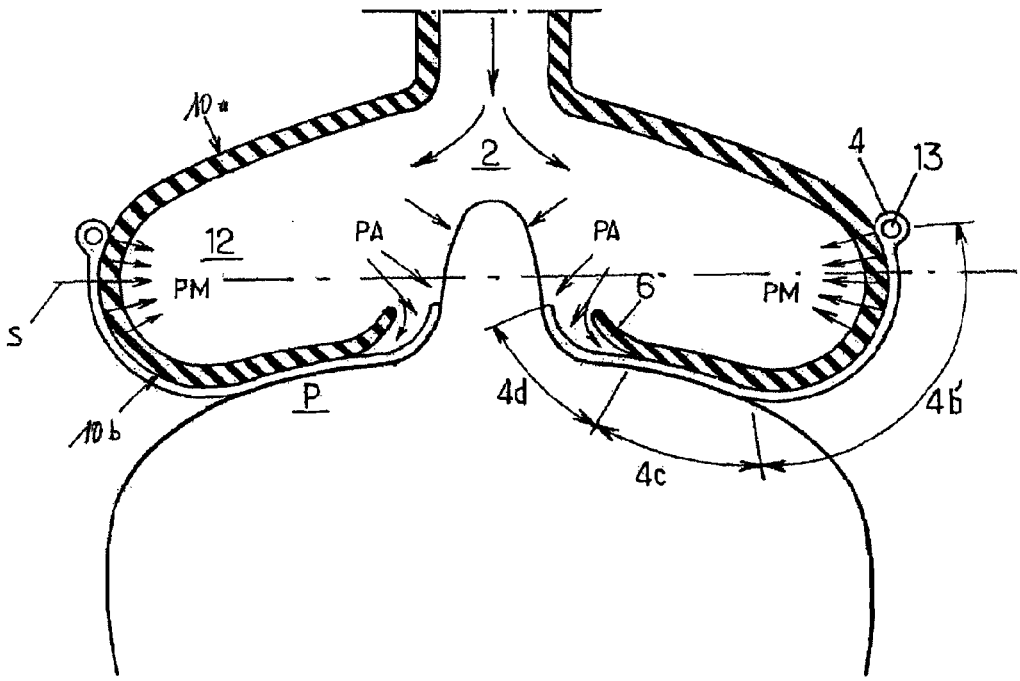
FIG. 7 diagrammatically represents, in horizontal cross section, an example of a third embodiment of a mask according to the invention, worn by a user.

A third exemplary embodiment of the mask according to the invention is represented in FIG. 7.

As for the embodiments described previously, this third embodiment of the mask 2 according to the invention includes an oronasal face piece, a semi-flexible lip element and fluid connection means similar to those described above.

FIG. 7 more particularly represents the semi-flexible lip element 6, the edge 11 of which, intended to be in contact with the face of a user, is provided with hygienic protection means 4. This edge 11 returns toward the center and the interior of the mask 2, forming an internal groove 12.

In this example, the hygienic protection means 4 are mainly placed outside the semi-flexible lip element 6. The hygienic protection means 4 mainly comprise a thin film which surrounds the semi-flexible lip element 6 on the outside. The intrinsic elasticity of this thin film enables it to be placed easily around the semi-flexible lip element 6. This thin film is, for example, made of silicone or latex.

The hygienic protection means 4 comprise three parts:

a part 4b' on which the thin film is pulled against the semi-flexible lip element 6; this area can be strengthened by a reinforcing structure consisting of an elastic thread 13 incorporated in the thin film; this particular arrangement allows the thin film to be replaced easily and firmly presses it on the outside of the semi-flexible lip element 6 by creating a pressure PM providing the seal between the thin film and the semi-flexible lip element 6; the elastic characteristics of the assembly comprising the thin film and the reinforcing structure are chosen so that the pressure PM exerted is greater than the relative pressure PA of the air contained inside the mask 2, but without being too great to avoid significantly distorting the semi-flexible lip element 6;

a part 4c placed between the skin P and the semi-flexible lip element 6 which forms a hygienic protection; and a part 4d extending beyond the semi-flexible lip element 6; this part is very flexible, is used to follow the contours of the skin P and any folds in it and thus provide the seal between the skin P and the thin film.

This thin film therefore provides a seal that is significantly better than the masks of the prior art.

The hygienic protection means described above are particularly economical, making their use and their regular replacement less costly.

The hygienic protection means can be stored in a sealed, sterile and possibly transparent plastic bag, also including disinfecting wipes. When the pilot is preparing his mask before a flight, he can therefore also clean the lips of the mask and of the visor before replacing the mask in the mask box.

The invention claimed is:

1. A respirator face mask providing physiological protection, comprising:

an oronasal face piece which is connectable to a respiratory gas source, said oronasal face piece having a semi-flexible lip with an edge designed to position said oronasal face piece on a user's face and, a hygienic protection system removably positioned at least partly inside said oronasal face piece and including a first part which provides hygienic protection and a second part which secures said hygienic protection system to the oronasal face piece, wherein the edge of the semi-flexible lip returns toward the center of the oronasal face piece, defining an internal groove in the oronasal face piece, and said second part of the hygienic protection system is disposed in the internal groove and expands radially in order to co-operate elastically with an internal face of the internal groove of the oronasal face piece.

2. The mask as claimed in claim 1, wherein said first and second parts of said hygienic protection system include different materials.

3. The mask as claimed in [one] claim 1, wherein a thin lip insulation part of said hygienic protection system prolongs, in at least one area, said second part of said hygienic protection system, so as to extend a few millimeters beyond said edge of said semi-flexible lip.

4. The mask as claimed in claim 3, wherein said thin lip [element] insulation part is prolonged over at least an external part of said semi-flexible lip.

5. The mask as claimed in claim 1, wherein said first part of said hygienic protection system includes a filter which is permeable to respiratory gases.

6. The mask as claimed in claim 5, wherein said first part at least partly filters any infection from a user.

7. The mask as claimed in claim 1, wherein said first part of said hygienic protection system has a corrugated shape, for reducing the pressure drop of said hygienic protection system.

8. The mask as claimed in claim 7, wherein said corrugated shape corresponds to waves substantially centered about a central area of said hygienic protection system, so as to facilitate extraction of said hygienic protection system from said mask.

9. The mask as claimed in claim 1 including a cord, attached to said hygienic protection system, for facilitating extraction of said hygienic protection system from said mask.

10. The mask as claimed in claim 1 wherein said second part of said hygienic protection system is silicone.

11. A respirator face mask according to claim 1 wherein said hygienic protection system is secured to the oronasal face piece only by contact of the second part with the semi-flexible lip.

12. A respirator face mask providing physiological protection, comprising:

an oronasal face piece which is connectable to a respiratory gas source, said oronasal face piece having a semi-flexible lip with an edge designed to position said oronasal face piece on a user's face, wherein the edge of the semi-flexible lip returns toward the center of the oronasal face [peace] *piece* and, a hygienic protection system which is removably positioned on the oronasal face piece, wherein the hygienic protection system comprises:

a lip insulation part which provides hygienic protection and is located over an external area of said semi-flexible lip extending up to said edge, and a lip securing part located outside the oronasal face piece, and which is elastic and exerts a *radially* compressing pressure on the oronasal face piece in order to maintain the hygienic protection system on the oronasal face piece,

*wherein the oronasal face piece has a maximum section where the section of the oronasal face piece is maximum, wherein at least a portion of the lip securing part is disposed on a first side of the maximum section and extends around an outer perimeter of the oronasal face piece, and the lip insulation part is disposed on a second side opposite to the first side with respect to the maximum section.*

13. The mask as claimed in claim 12, wherein said lip insulation part of said hygienic protection system covers an area of said semi-flexible lip which, in the absence of said hygienic protection system, would have been in contact with said user's face once said mask was in place on said user's face.

14. The mask as claimed in claim 12, wherein said lip securing part of said hygienic protection system includes an elastic thread gripping said semi-flexible lip.

15. [The mask as claimed in claim 12,] *A respirator face mask providing physiological protection, comprising:*

*an oronasal face piece which is connectable to a respiratory gas source, said oronasal face piece having a semi-flexible lip with an edge designed to position said oronasal face piece on a user's face, wherein the edge of the semi-flexible lip returns toward the center of the oronasal face piece and,*

*a hygienic protection system which is removably positioned on the oronasal face piece, wherein the hygienic protection system comprises:*

*a lip insulation part which provides hygienic protection and is located over an external area of said semi-flexible lip extending up to said edge, and*

*a lip securing part located outside the oronasal face piece, and which is elastic and exerts a radially compressing pressure on the oronasal face piece in order to maintain the hygienic protection system on the oronasal face piece,*

*wherein the oronasal face piece has a maximum section where the section of the oronasal face piece is maximum, wherein at least a portion of the lip securing part is disposed on a first side of the maximum section, and the lip insulation part is disposed on a second side opposite to the first side with respect to the maximum section,* wherein a flexible structure is placed between said hygienic protection system and an internal part of said semi-flexible lip, said flexible structure extending beyond said semi-flexible lip.

16. [The mask as claimed in claim 12,] *A respirator face mask providing physiological protection, comprising:*

*an oronasal face piece which is connectable to a respiratory gas source, said oronasal face piece having a semi-flexible lip with an edge designed to position said oronasal face piece on a user's face, wherein the edge of the semi-flexible lip returns toward the center of the oronasal face piece and,*

*a hygienic protection system which is removably positioned on the oronasal face piece, wherein the hygienic protection system comprises:*

*a lip insulation part which provides hygienic protection and is located over an external area of said semi-flexible lip extending up to said edge, and*

*a lip securing part located outside the oronasal face piece, and which is elastic and exerts a radially compressing pressure on the oronasal face piece in order to maintain the hygienic protection system on the oronasal face piece,*

*wherein the oronasal face piece has a maximum section where the section of the oronasal face piece is maximum, wherein at least a portion of the lip securing part is disposed on a first side of the maximum section, and the lip insulation part is disposed on a second side opposite to the first side with respect to the maximum section,* wherein a flexible structure is placed outside said hygienic protection system, and inside said semi-flexible lip, said extendible structure extending beyond said semi-flexible lip.

17. The mask as claimed in claim 12, wherein the lip securing part of said hygienic protection system comprises a structural part providing a seal between said oronasal face piece and said hygienic protection system, and said hygienic protection system further comprises a lip extension part designed to be pressed onto said user's face, by the effect of a pressure of respiratory gas inside said mask, when said mask is worn, to provide a seal between said hygienic protection system and said user's face.

18. The mask as claimed in claim 17, wherein said structural part exerts a mechanical pressure on said semi-flexible lip, which is greater than a maximum pressure of respiratory gas, which can prevail inside said mask.

19. The mask as claimed in claim 17, wherein the lip insulation part, the lip securing part, and the lip extension part form a single elastic film.

20. The mask as claimed in claim 17, wherein said structural part includes an elastic thread.

[21. The mask as claimed in claim 12, wherein the oronasal face piece has a maximum section, wherein the lip securing part is disposed on a side of the maximum section, and wherein at least a portion of the lip insulation part is disposed on an opposite side of the maximum section.]

*22. A respirator face mask providing physiological protection, comprising:*

*an oronasal face piece which is connectable to a respiratory gas source, said oronasal face piece having a semi-flexible lip designed to position said oronasal face piece on a user's face, said semi-flexible lip having an internal face, and external face and an edge between the internal face and the external face,*

*a hygienic protection system removably positioned on said semi-flexible lip and including:*

*a first part comprising a hygienic protection part including a filter which is permeable to respiratory gases,*

*a second part comprising an internal part in contact with the internal face of the semi-flexible lip,*

*a third part comprising an edge part which forms a thin lip and prolongs the internal part,*

*a fourth part comprising an external part which also forms a thin lip, wherein the external part prolongs the edge part, faces the internal part, and is in contact with a peripheral portion of the external face of the semi-flexible lip.*

*23. The mask as claimed in claim 22, wherein said hygienic protection part and internal part of said hygienic protection system include different materials.*

*24. The mask as claimed in claim 22, wherein said hygienic protection part at least partly filters any infection from a user.*

*25. The mask as claimed in claim 22 wherein said internal part, edge part, and external part of said hygienic protection system are made of silicone.*

*26. The mask as claimed in claim 22, wherein said external part of said hygienic protection system covers an area of said semi-flexible lip which, in the absence of said hygienic protection system, would have been in contact with said user's face once said mask was in place on said user's face.*

*27. The mask as claimed in claim 22, wherein the internal part, the edge part and the external part define a peripheral releasable portion having a U-form section which pinches the semi-flexible lip.*

*28. The mask as claimed in claim 22, wherein the internal part surrounds the hygienic protection part and is interposed between the hygienic protection part and the edge part.*

*29. The mask as claimed in claim 22, wherein the internal part, the edge part and the external part are in airtight material.*

*30. A respirator face mask providing physiological protection, comprising:*

*an oronasal face piece which is connectable to a respiratory gas source, said oronasal face piece having a semi-flexible lip with an edge designed to position said oro-*

*nasal face piece on a user's face, wherein the edge of the semi-flexible lip returns toward the center of the oronasal face piece and,*

*a hygienic protection system which is removably positioned on the oronasal face piece, wherein the hygienic protection system comprises:*

*a lip insulation part which provides hygienic protection and is located over an external area of said semi-flexible lip extending up to said edge, and*

*a lip securing part located outside the oronasal face piece, and which is elastic and exerts a radially compressing pressure on the oronasal face piece in order to maintain the hygienic protection system on the oronasal face piece,*

*wherein the oronasal face piece has a maximum section where the section of the oronasal face piece is maximum, wherein at least a portion of the lip securing part is disposed on a first side of the maximum section, and the lip insulation part is disposed on a second side opposite to the first side with respect to the maximum section,*

*wherein the hygienic protection system further comprises a structural part which is in contact with an internal face of the semi-flexible lip.*

*31. The mask as claimed in claim 29, wherein the semi-flexible lip defines an internal groove in the oronasal face piece and said structural part co-operates elastically with said internal groove.*

* * * * *